(12) United States Patent
Yamazaki et al.

(10) Patent No.: US 7,937,562 B2
(45) Date of Patent: May 3, 2011

(54) PROCESSING APPARATUS

(75) Inventors: Itaru Yamazaki, Inagi (JP); Tatsuo Teruyama, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1408 days.

(21) Appl. No.: 11/190,062

(22) Filed: Jul. 27, 2005

(65) Prior Publication Data

US 2006/0195679 A1    Aug. 31, 2006

(30) Foreign Application Priority Data

Feb. 28, 2005    (JP) ................................ 2005-053396

(51) Int. Cl.
*G06F 9/00*    (2006.01)
(52) U.S. Cl. ...................................................... 712/214
(58) Field of Classification Search .................... 712/214
See application file for complete search history.

(56) References Cited

U.S. PATENT DOCUMENTS 7,000,039 B2    2/2006    Ishibashi
7,051,329 B1 *    5/2006    Boggs et al. .................. 718/104

FOREIGN PATENT DOCUMENTS

| KR | 2002-0045791 | 6/2002 |
| TW | 558887 | 10/2003 |
| TW | 591417 | 6/2004 |
| WO | 2004-095245 A2 | 11/2004 |

OTHER PUBLICATIONS

Notification of Filing Examination Opinion in Taiwan Application No. TW094125605 dated Nov. 23, 2007 and English Translation thereof.
Balasubramonian et al., "Dynamically Allocating Processor Resources between Nearby and Distant ILP" 0-7695-1162-7/01, IEEE, 2001.
Baniasadi et al., "Instruction Distribution Heuristics for Quad-Cluster, Dynamically-Scheduled, Superscalar Processors" 0-7695-0924-X/00, IEEE, 2000.

* cited by examiner

*Primary Examiner* — Alford W Kindred
*Assistant Examiner* — Benjamin P Geib
(74) *Attorney, Agent, or Firm* — Banner & Witcoff, Ltd.

(57) ABSTRACT

A processing apparatus includes an execution stage which executes each of instruction streams, a first resource counter which counts the number of operating resources used when the execution stage executes a first one of the instruction streams, a second resource counter which holds data of the number of unused ones of the operating resources, and a control circuit which reads the count value of the first resource counter from a management table when a subsequent instruction stream is executed, to control a start of execution of the subsequent instruction stream in accordance with a subtraction result obtained by subtracting the count value from the data. The control circuit checks whether a number of operating resources required by the subsequent instruction stream is secured based on the subtraction result before the subsequent instruction stream starts to be executed.

16 Claims, 8 Drawing Sheets

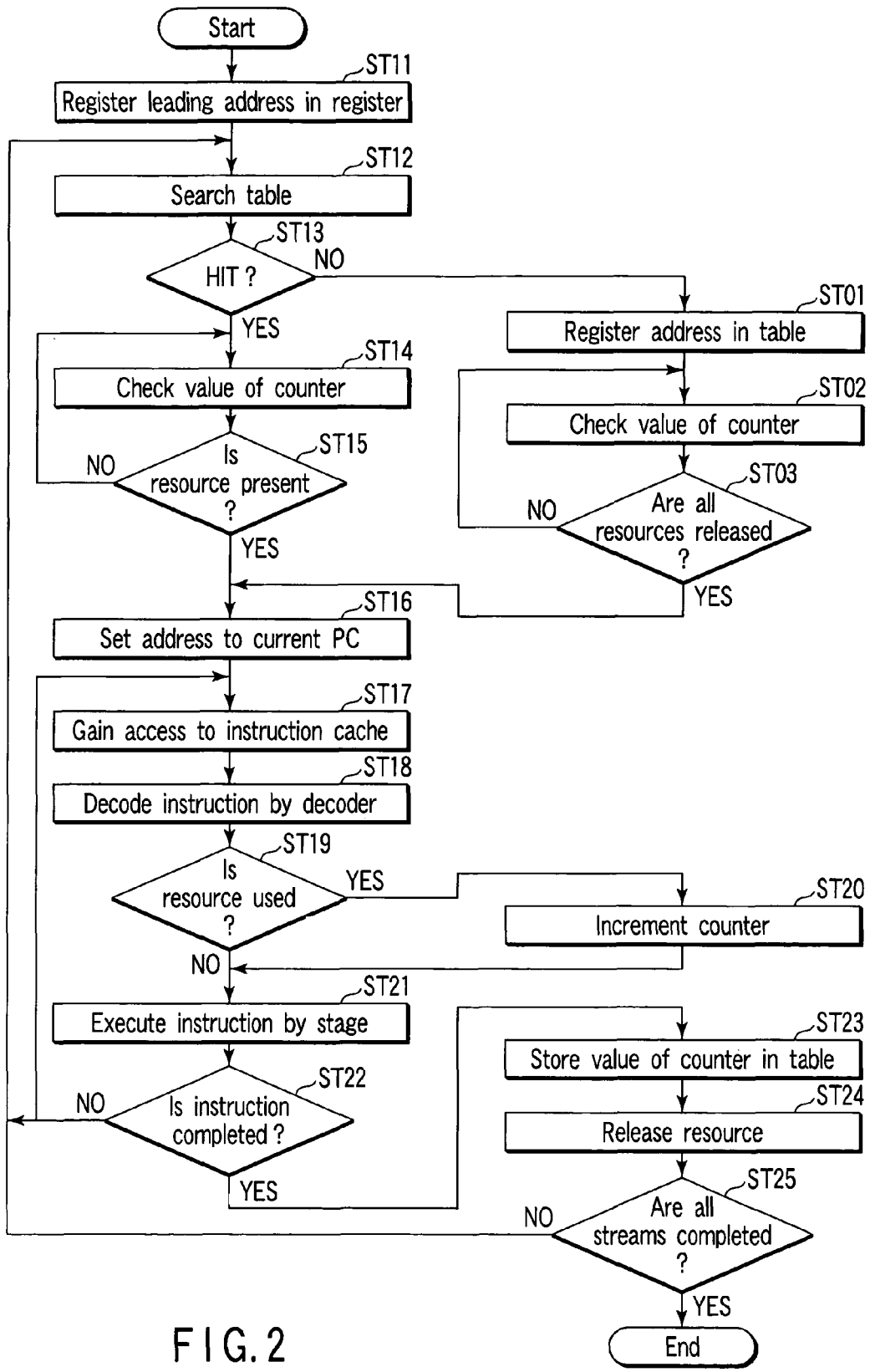
F I G. 2

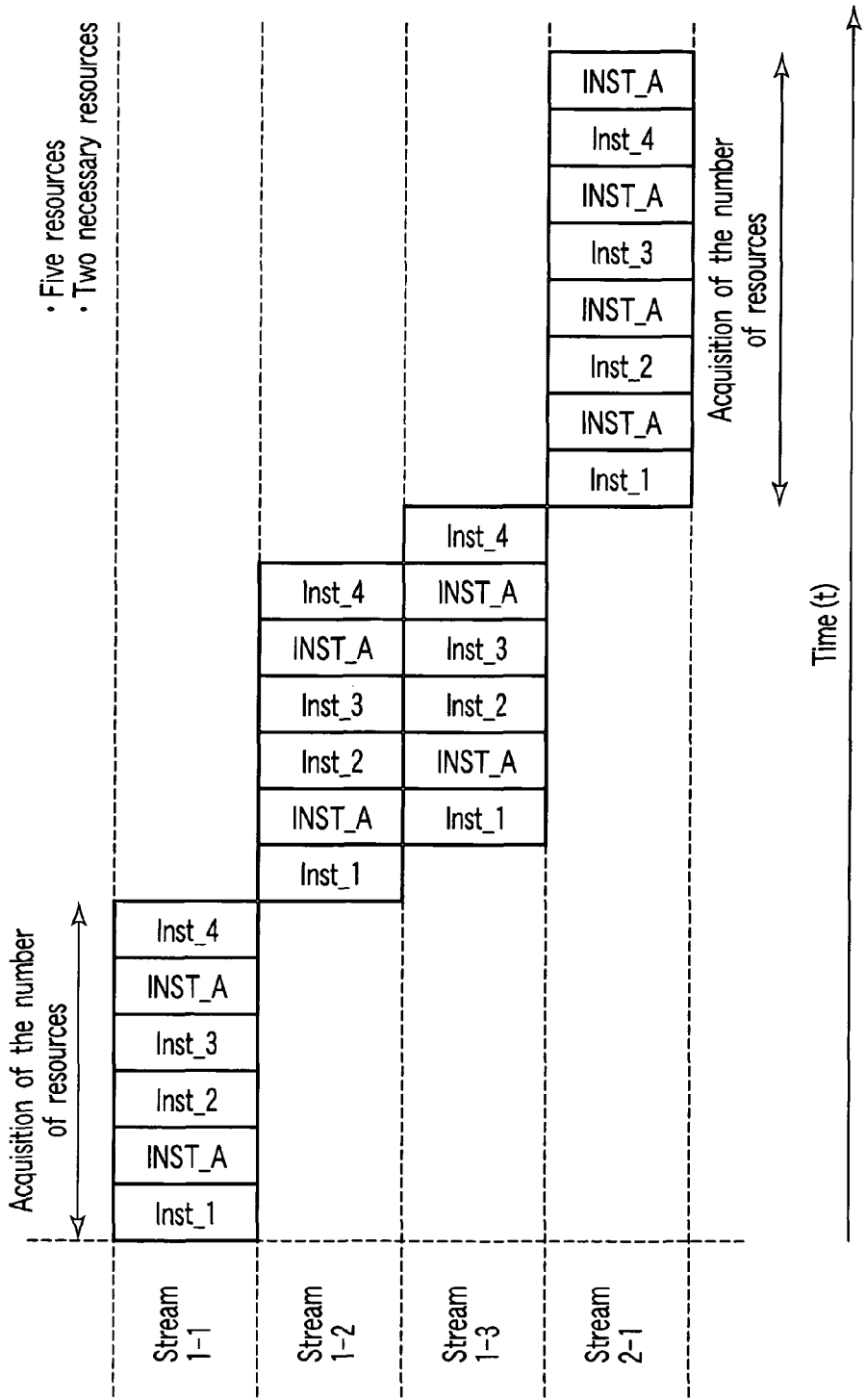
F I G. 5

US 7,937,562 B2

PROCESSING APPARATUS

CROSS-REFERENCE TO RELATED APPLICATIONS

This application is based upon and claims the benefit of priority from prior Japanese Patent Application No. 2005-053396, filed Feb. 28, 2005, the entire contents of which are incorporated herein by reference.

BACKGROUND OF THE INVENTION

1. Field of the Invention

The present invention relates to a processing apparatus. More specifically, the invention relates to a digital signal processor (DSP) that shares a plurality of operating resources (operating pipes) to execute a plurality of instruction streams (program strings) at once.

2. Description of the Related Art

The recent advance of microfabrication technology has allowed a number of circuits to be incorporated into a single large-scale integrated circuit (LSI). Such an LSI has a very large number of operating resources to allow a more complicated operation to be performed at high speed.

In particularly, a high-performance DSP capable of executing a plurality of instruction streams at once has to occupy operating resources until one of the instruction streams is completed in order to maximize its performance. In other words, once an instruction stream starts, an operating resource used by an instruction in the instruction stream is prevented from being released (pipeline-stalled) before the instruction stream is completed. The instruction streams can thus be increased in execution speeds.

However, a DSP that does not release any operating resources before one instruction stream is completed has a problem of very low efficiency of operations.

BRIEF SUMMARY OF THE INVENTION

According to one exemplary embodiment of the present invention, there is provided a processing apparatus having a plurality of operating resources and configured to execute a plurality of instruction streams at once, comprising an execution stage which executes each of the instruction streams using some of the operating resources, a first resource counter which counts the number of operating resources used when the execution stage executes a first one of the instruction streams, a management table which stores a count value of the first resource counter, a second resource counter which holds data of the number of unused ones of the operating resources, and a control circuit which reads the count value of the first resource counter from the management table when a subsequent instruction stream is executed, to control a start of execution of the subsequent instruction stream in accordance with a subtraction result obtained by subtracting the count value from the data held in the second resource counter, wherein the control circuit checks whether a number of operating resources required by the subsequent instruction stream is secured based on the subtraction result before the subsequent instruction stream starts to be executed.

BRIEF DESCRIPTION OF THE SEVERAL VIEWS OF THE DRAWING

FIG. 2 is a flowchart illustrating an operation according to each of first, second and third examples of the DSP shown in FIG. 1;

FIG. 5 is an illustration of the operation according to the third example;

DETAILED DESCRIPTION OF THE INVENTION

Embodiments of the present invention will be described with reference to the accompanying drawings.

First Embodiment

Figure 1:
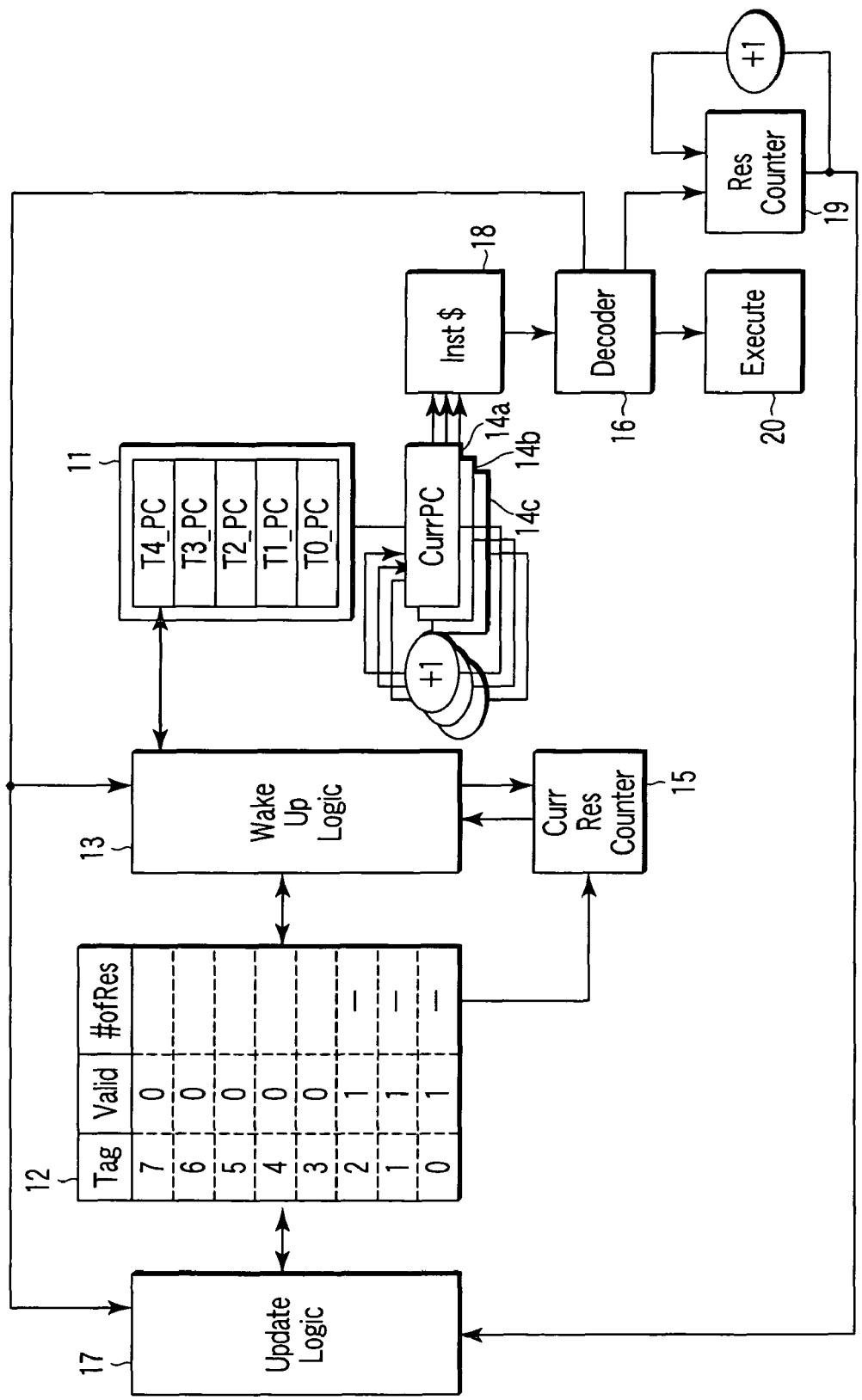
FIG. 1 is a block diagram showing an example of a configuration of a processing apparatus (DSP) according to a first embodiment of the present invention.

FIG. 1 shows a configuration of a processing apparatus (DSP) according to a first embodiment of the present invention. In the first embodiment, the DSP can execute a maximum of three instruction streams (program strings) in the same pattern at once while varying data. Assume here that the DSP includes five operating resources (units) in the same pattern which are occupied from start to end of execution of the instruction streams. Assume also that hardware other than operating resources used for executing the three instruction streams at once is pipelined, or the DSP has hardware capable of executing the three instruction streams in parallel.

As shown in FIG. 1, an instruction stream address register 11 registers the leading address of an instruction stream to be executed, which is stored in a memory (e.g., an instruction cache described later). In the first embodiment, the leading addresses of a maximum of five instruction streams can be registered. This registration is performed by, e.g., an external control unit (not shown).

An operating resource management table 12 is configured by a content addressable memory (CAM). This table 12 has fields "Tag", "Valid", and "#ofRes (number of resources)" for each address n (n=0 to 7, for example) to register eight items of resource management information in all. In each of the items of resource management information, the field "Tag" is a location in which part or all of the leading address of a corresponding instruction stream are stored. The field "Valid" is a location in which information indicating whether the registration of resource management information is effective or not is stored. The field "#ofRes" is a location in which the number of operating resources required for executing the corresponding instruction stream (required operating resource number) is stored.

The operating resource management table 12 is searched using the leading addresses of the instruction streams registered in the instruction stream address register 11. When the leading address coincides with (hits on) the value of "TAG" and the value of "Valid" is "1", the required operating resource number is read out of the corresponding "#ofRes" field. If the value of "Tag" is part of the leading addresses of the instruction streams, another means (e.g., a means as used when a hit is found in an instruction cache used in a normal microprocessor) correctly determines whether the instruction streams are in the same pattern.

Wakeup logic 13 of a control circuit searches the operating resource management table 12 based on the leading address registered in the instruction stream address register 11. The wakeup logic 13 sets one of the leading addresses stored in the register 11 to any one of three current program counters 14a, 14b and 14c. The wakeup logic 13 controls count-up and count-down of a current resource counter 15 (second resource counter) in accordance with the required operating resource number. The wakeup logic 13 also controls an update logic 17 based on the output of a decoder 16.

The update logic 17 registers resource management information in the operating resource management table 12. Specifically, the update logic 17 stores "Tag", sets "Valid", stores "#ofRes" and the like.

The current resource counter 15 manages the operating resource counter that is not currently used.

The current program counters 14a, 14b and 14c gains access to, e.g., an instruction cache 18 in accordance with the leading address of the instruction stream set by the wakeup logic 13.

The decoder 16 decodes an instruction (program) read out of the instruction cache 18. The decoder 16 detects that an instruction stream is completed and notifies the logics 13 and 17 of it. The decoder 16 also increments the value of a resource counter 19 (first resource counter) by one when the decoded instruction requires an operating resource. If an instruction fetched from the instruction cache 18 uses no operating resource, the value of the resource counter 19 is not incremented.

An instruction execution stage 20 executes the instruction decoded by the decoder 16. The stage 20 includes a plurality of pieces of hardware. Five of these pieces of hardware each have a plurality of cycles and correspond to operating resources that are not released before an instruction stream is completed.

The DSP executes the instruction streams in sequence while varying data. When the decoder 16 detects the completion of the first instruction stream (first pass), the value of the resource counter 19 is sent to the update logic 17 and thus stored in the field "#ofRes" in the operating resource management table 12. The value of "Valid" is set to "1". Referring to the value of "#ofRes" and that of the current resource counter 15, an operator can confirm the operating resource number required by the subsequent instruction stream and easily determine whether the instruction streams can be executed in parallel.

An operation of the DSP so configured will be described with reference to the flowchart shown in FIG. 2.

First Example

Figure 3:
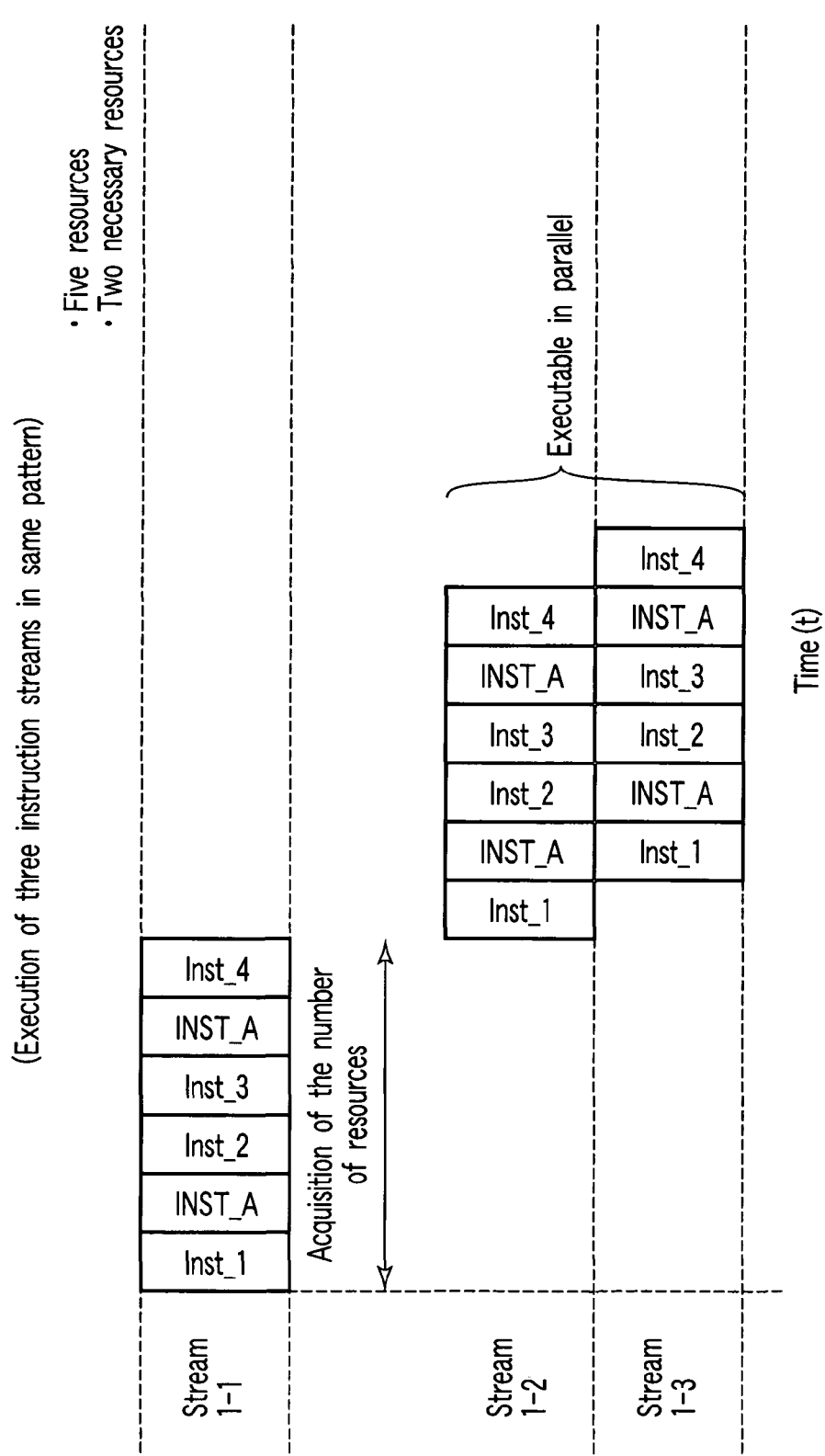
FIG. 3 is an illustration of the operation according to the first example.

Assume in the first example that streams 1-1, 1-2 and 1-3 are to be executed. These instruction streams 1-1, 1-2 and 1-3 are in the same pattern. As shown in FIG. 3, each of the instruction streams 1-1, 1-2 and 1-3 includes four instructions Inst_1 to Inst_4 and two instructions INST_A. The instructions Inst_1 to Inst_4 require no operating resource (e.g., UNIT_A), whereas the instructions INST_A need to occupy an operating resource from start to end of execution of an instruction stream. In the first example, each of the instruction streams 1-1 to 1-3 is a program string using two of five operating resources UNIT_A of the DSP.

Assume that the leading addresses of the instruction streams 1-1, 1-2 and 1-3 are registered in T0_PC, T1_PC and T2_PC of the instruction stream address register 11, respectively.

Assume first that the leading addresses of the instruction streams 1-1, 1-2 and 1-3 are registered in the instruction stream address register 11 (step ST11). Then, the wakeup logic 13 searches the operating resource management table 12 based on the leading address registered in T0_PC of the register 11 (step ST12).

It is assumed in the first example that the instruction stream 1-1 is executed for the first time (first pass) or no instruction streams are executed before the instruction stream 1-1 is done. In this case, no hit is found in the resource management information in the table 12 (step ST13). Upon receiving an instruction from the wakeup logic 13, the update logic 17 stores part or all of the leading address of the instruction stream 1-1 in the field "Tag" corresponding to address "n" in the table 12 (step ST01).

After that, the wakeup logic 13 checks a value of the current resource counter 15 (step ST02). When none of operating resources UNIT_A are released (step ST03), the wakeup logic 13 stands by until they are all released. In the first example, all the operating resources UNIT_A are released when the value of the current resource counter 15 is "5". In other words, all the operating resources UNIT_A are determined as unused (unoccupied) ones.

When all the operating resources UNIT_A are released (step ST03), the wakeup logic 13 sets the leading address of the instruction stream 1-1 to any one of the current program counters 14a, 14b and 14c (step ST16). The set current program counter gains access to the instruction cache 18 in accordance with an address incremented by execution of the instruction stream (step ST17). The decoder 16 decodes an instruction fetched from the instruction cache 18 (step ST18). If the instruction requires an operating resource UNIT_A (step ST19), the value of the resource counter 19 is incremented by one (step ST20).

When it is determined that all the preceding instruction streams are completed by releasing all the operating resources UNIT_A, the instruction execution stage 20 actually executes the instruction (step ST21). The wakeup logic 13 updates (5−2) the value of the current resource counter 15 in accordance with the total number (2) of operating resources UNIT_A used for executing the instruction stream 1-1.

After that, the decoder 16 detects the completion of the instruction stream 1-1 (step ST22). The value (2) of the resource counter 19 is sent to the update logic 17 and stored in the field "#ofRes" corresponding to the address "n" in the operating resource management table 12 (step ST23). The value "1" of "Valid" corresponding to the address "n" is updated to "1". Thus, the resource management information corresponding to the instruction stream 1-1 is registered in the operating resource management table 12.

When the instruction stream 1-1 is completed, the operating resources UNIT_A used for executing the instruction stream 1-1 are released (step ST24). The wakeup logic 13 updates (3+2) the value of the current resource counter 15 in accordance with the total number (2) of operating resources UNIT_A used for executing the instruction stream 1-1.

The wakeup logic 13 determines whether all the instruction streams 1-1, 1-2 and 1-3 are completed or not (step ST25). If they are completed, the process ends.

If they are not completed, the process returns to step ST12. When the same-pattern instruction streams are executed in sequence, the wakeup logic 13 searches the operating resource management table 12 in order to start the instruction stream 1-2 after the instruction stream 1-1 is completed (step ST12). The wakeup logic 13 searches the table 12 based on the leading address of the instruction stream 1-2 registered in T1_PC of the instruction stream address register 11. At this time, the resource management information of the instruction stream 1-1 has already been registered in the table 12. In other words, a hit is found in the resource management information of the instruction stream 1-1 since the instruction streams 1-1 and 1-2 have the same start address and thus (step ST13).

If a hit is found in the resource management information, the value (2) of "#ofRes" thereof is subtracted from the value (5) of the current resource counter 15. The result of the subtraction is sent to the wakeup logic 13 (steps ST14 and ST15). If the result is not negative, there still remains an operating resource UNIT_A necessary for executing the instruction stream 1-2.

The wakeup logic 13 sets the leading address registered in T1_PC of the instruction stream address register 11 to any one of the unused current program counters 14a, 14b and 14c (step ST16). After that, the process of step ST17 and the following steps is repeated. Accordingly, the instruction stream 1-2 starts to be executed.

The current resource counter 15 is updated unless the result of the subtraction is negative. If the result of the subtraction is negative, there remain no operating resources UNIT_A enough to execute the instruction stream 1-2. The wakeup logic 13 does not start to execute the instruction stream 1-2 before an adequate number of operating resources UNIT_A are obtained.

In the first example, the instruction stream 1-1 has already been completed when it is checked whether to start the instruction stream 1-2. The value of the current resource counter 15 is therefore "5", whereas the total number of operating resources UNIT_A required for executing the instruction stream 1-2 is "2". The wakeup logic 13 can thus set the leading address of the instruction stream 1-2 to any one of the current program counters 14a, 14b and 14c to start to execute the instruction stream 1-2.

It is determined whether to execute the instruction stream 1-3 in parallel with the instruction stream 1-2 while the resource management information is registered in the operating resource management table 12. In other words, when the same instruction stream 1-3 is also registered in the instruction stream address register 11, it is checked whether to start to execute the instruction stream 1-3 in steps ST12 to ST15 in parallel with the instruction stream 1-2.

In the first example, the value of the current resource counter 15 is "3" when the instruction stream 1-2 starts. The instruction stream 1-3 can thus be executed in parallel with the instruction stream 1-2. The wakeup logic 13 starts to execute the instruction stream 1-3 when the value (subtraction result) of the current resource counter 15 is found not negative (steps ST14 and ST15). The leading address registered in T2_PC of the register 11 is set to any one of the unused current program counters 14a, 14b and 14c. Thus, the instruction streams 1-1, 1-2 and 1-3 are each executed with the timing shown in FIG. 3.

The current resource counter 15 is updated by the subtraction result (3−2). The value of the current resource counter 15 becomes "1" when the instruction stream 1-3 starts.

Second Example

Figure 4:
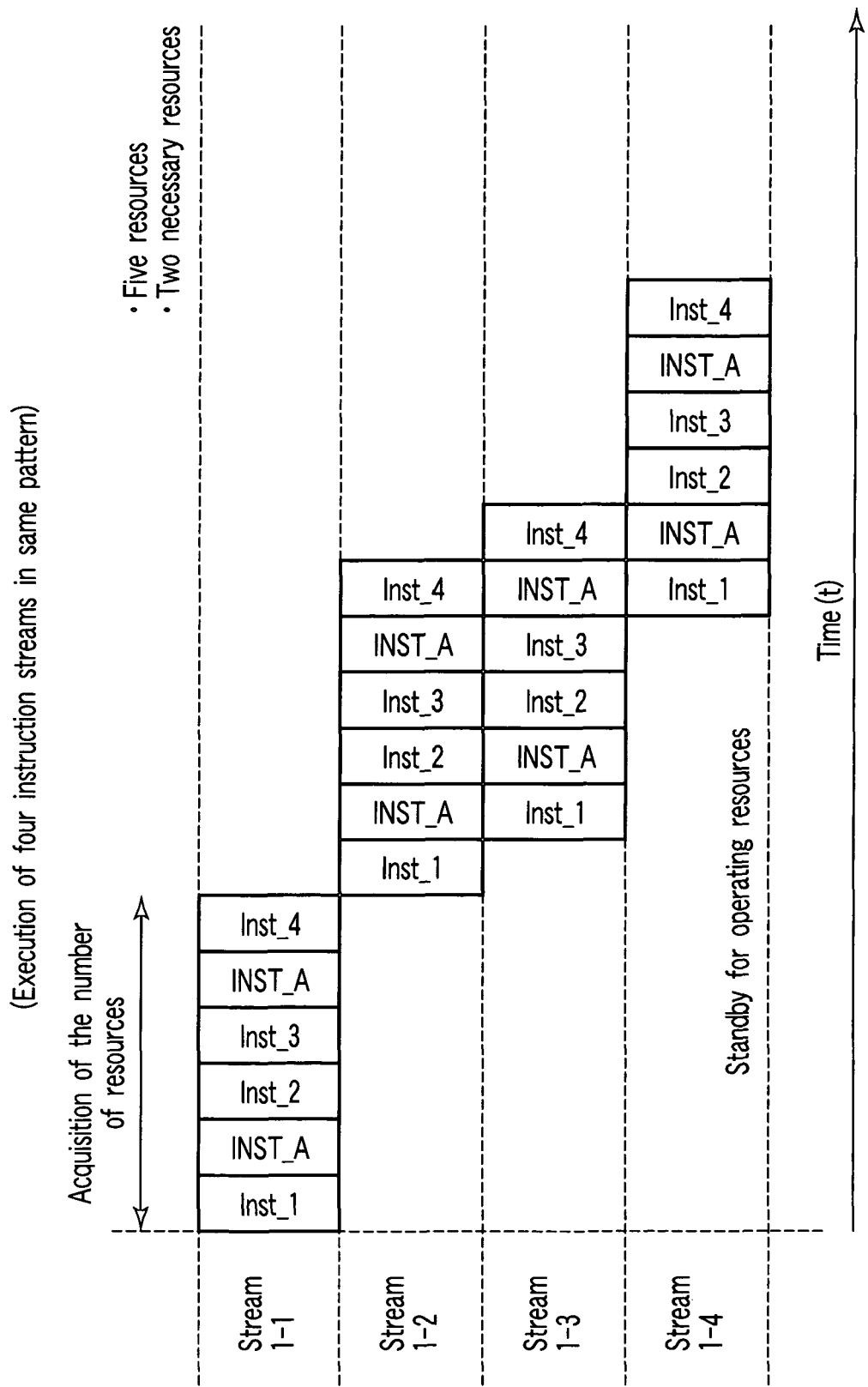
FIG. 4 is an illustration of the operation according to the second example.

Assume in the second example that instruction streams 1-1, 1-2, 1-3 and 1-4 are to be executed. These instruction streams 1-1, 1-2, 1-3 and 1-4 are in the same pattern. As shown in FIG. 4, each of the instruction streams 1-1, 1-2, 1-3 and 1-4 includes four instructions Inst_1 to Inst_4 and two instructions INST_A.

Assume that the leading addresses of the instruction streams 1-1, 1-2, 1-3 and 1-4 are registered in T0_PC, T1_PC, T2_PC and T3_PC of the instruction stream address register 11, respectively.

Assume that the leading address of the instruction stream 1-4 is registered in the instruction stream address register 11 while the instruction stream 1-3 is being executed. As in the first example, the wakeup logic 13 searches the operating resource management table 12 based on the leading address registered in T3_PC of the register 11 (step ST12).

In the second example, too, a hit is found in the resource management information of the instruction stream 1-1 that has been registered in the table 12 (step ST13). However, the value of the current resource counter 15 is "1" when the instruction stream 1-3 starts (step ST14). A result obtained by subtracting the value (2) of "#ofRes" of the resource management information from the value (1) of the counter 15 is a negative value (−1). Therefore, the wakeup logic 13 does not start to execute the instruction stream 1-4 before an adequate number of operating resources UNIT_A are obtained (step ST15).

During the execution of the instruction streams 1-2 and 1-3, there are no operating resources UNIT_A enough to execute the instruction stream 1-4. When the instruction stream 1-2 is completed, two operating resources UNIT_A occupied by this instruction stream are released. Accordingly, the value of the current resource counter 15 is updated (1+2). It is thus possible to secure a required number of operating resources UNIT_A for executing the instruction stream 1-4. Consequently, the instruction stream 1-4 starts with the timing shown in FIG. 4.

Third Example

Assume in the third example that instruction streams 1-1, 1-2, 1-3 and 2-1 are to be executed. The instruction streams 1-1, 1-2 and 1-3 are in the same pattern. As shown in FIG. 5, each of these instruction streams 1-1, 1-2 and 1-3 includes four instructions Inst_1 to Inst_4 and two instructions INST_A. In contrast, the instruction stream 2-1 has a pattern other than that of the instruction streams 1-1, 1-2 and 1-3. As shown in FIG. 5, the instruction stream 2-1 has four instructions Inst_1 to Inst_4 and four instructions INST_A. In the third example, each of the instruction streams 1-1 to 1-3 is a program string using two of five operating resources UNIT_A of the DSP, while the instruction stream 2-1 is a program string using four operating resources UNIT_A thereof.

Assume that the leading addresses of the instruction streams 1-1, 1-2 and 1-3 are registered in T0_PC, T1_PC and T2_PC of the instruction stream address register 11, respectively and the leading address of the instruction stream 2-1 is registered in T3_PC of the register 11.

Assume that the leading address of the instruction stream 2-1 is registered in the instruction stream address register 11 while the instruction stream 1-3 is being executed. As in the second example, the wakeup logic 13 searches the operating resource management table 12 based on the leading address registered in T3_PC of the register 11 (step ST12).

When the leading address of not the instruction stream 1-4 but the instruction stream 2-1 not executed so far is registered in the register 11, the resource management information of the instruction stream 2-1 has not yet been registered in the table 12. No hit is therefore found in the table 12 (step ST13). Since the number of operating resources required for executing the instruction stream 2-1 is unknown, the instruction stream 2-1 cannot start until all instruction streams under execution are completed.

First, as described in the first example, the process in step ST01 and the following steps is performed in order to register the resource management information of the instruction stream 2-1 in the table 12. Thus, a required number of operating resources for executing the instruction stream 2-1 are acquired. The instruction stream 2-1 starts when the instruction stream 1-3 is completed (step ST03) as shown in FIG. 5.

As described above, when a plurality of instruction streams in the same pattern are executed in sequence varying data, it is possible to easily determine whether to execute an instruction stream in parallel with another one. In other words, when a plurality of instruction streams in the same pattern are executed in sequence, the instruction stream of the first pass is executed while all the operating resources are released, and the number of operating resources used when the instruction stream is executed is stored in the table. After that, a required number of operating resources can automatically be confirmed with reference to the table when the instruction streams in the same pattern are executed. Thus, the instruction streams that can be executed in parallel can easily be woken up without setting the number of resources occupied by the instruction streams one by one by a user. If, furthermore, a pipeline of the operating resources is so designed that it can be stalled, the drawback that the operating resources decrease in operating speed can be resolved. Consequently, a plurality of operating resources can effectively be used and a plurality of instruction streams can be executed at high speed.

In the foregoing first embodiment, not only two instruction streams can be executed in parallel but also three or more instruction streams can be done in parallel.

Second Embodiment

Figure 6:
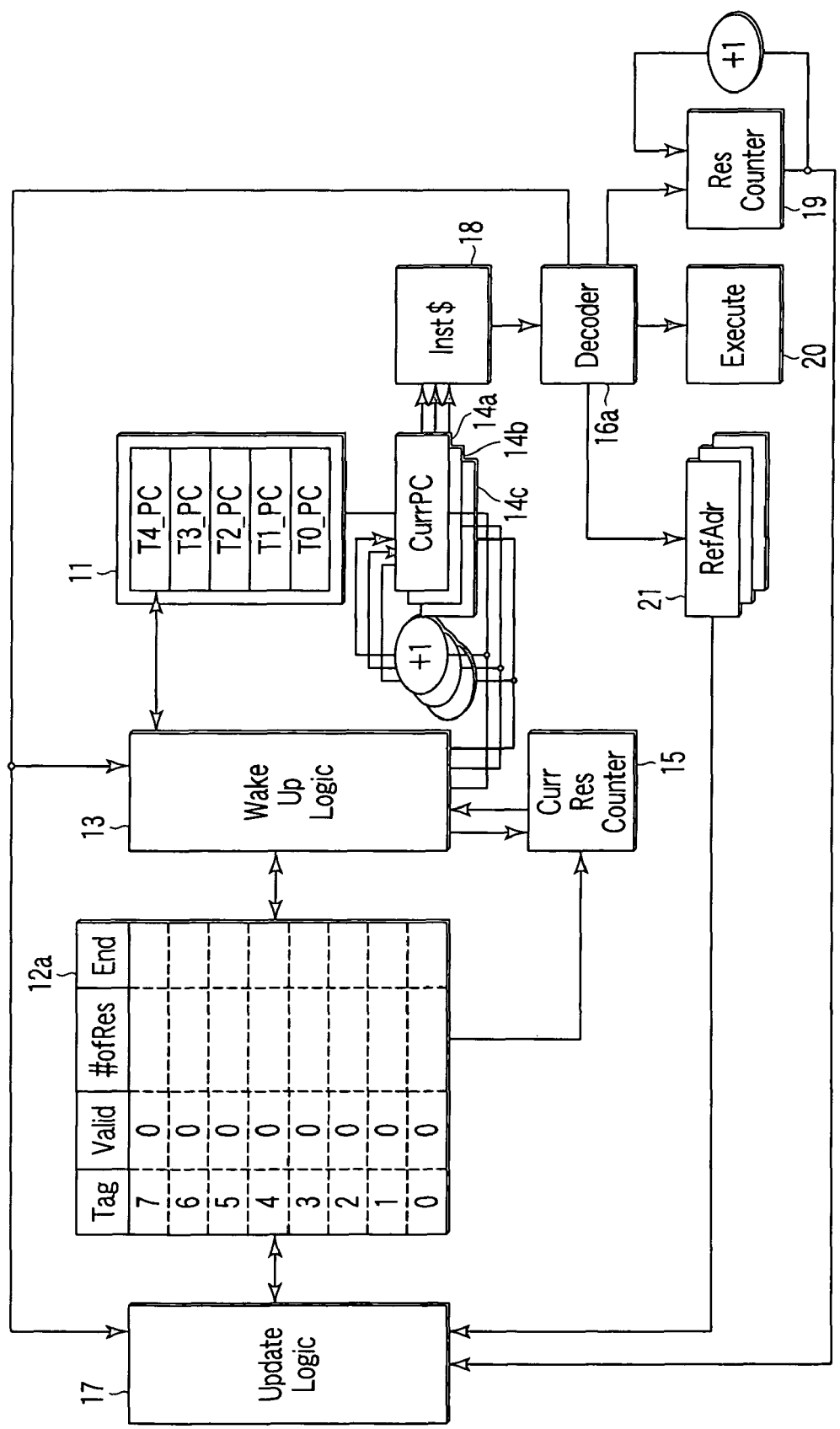
FIG. 6 is a block diagram showing an example of a configuration of a processing apparatus (DSP) according to a second embodiment of the present invention.

FIG. 6 shows a configuration of a processing apparatus (DSP) according to a second embodiment of the present invention. In the second embodiment, when the operating resource become unnecessary in the DSP shown in FIG. 1, they can be released without waiting for the completion of the instruction streams. The same components as those of FIG. 1 are indicated by the same reference numerals and their detailed descriptions are omitted.

Figure 7:
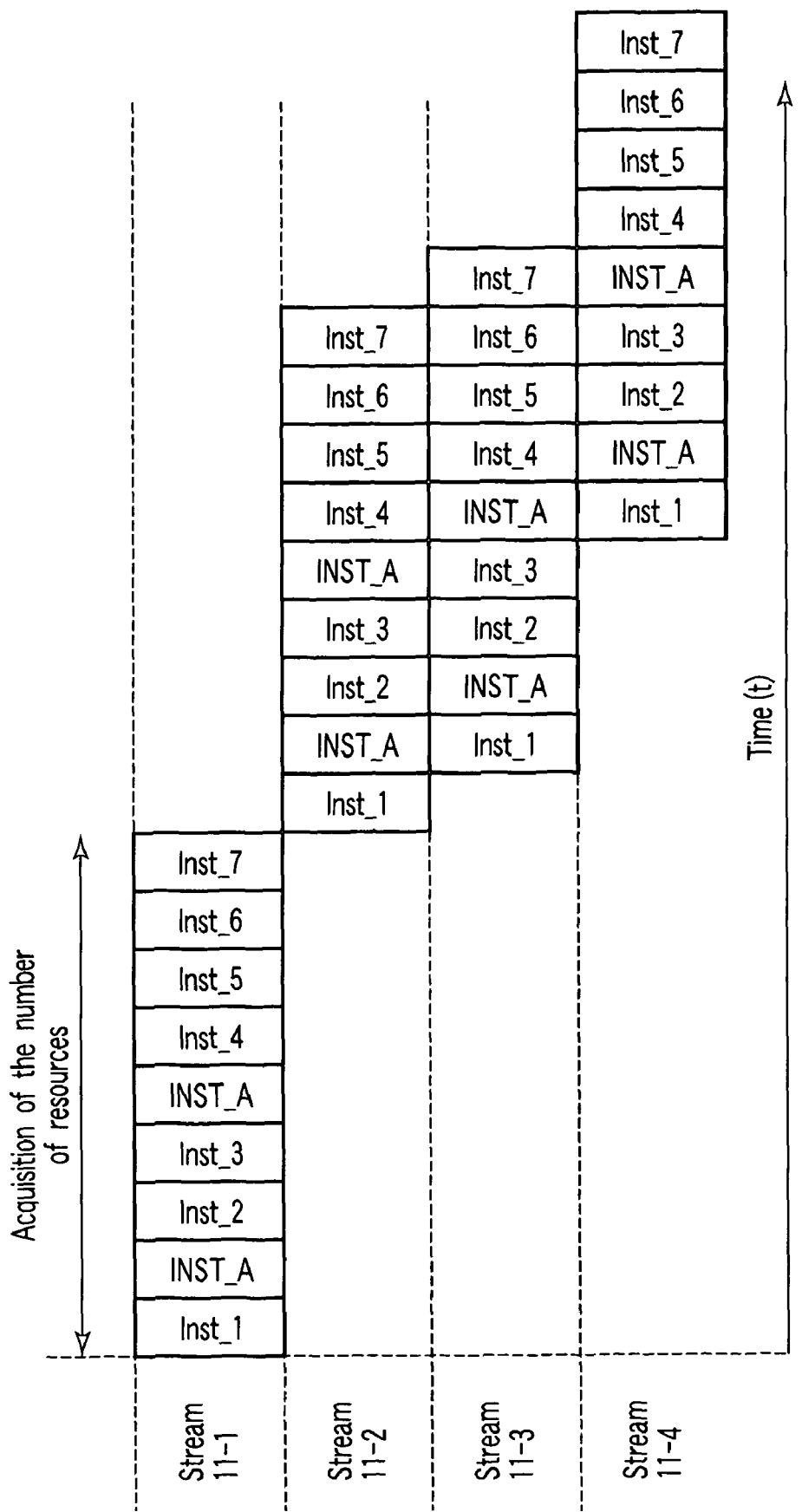
FIG. 7 is an illustration of an operation of the DSP shown in FIG. 6.

Assume in the second embodiment that instruction streams 11-1, 11-2, 11-3 and 11-4 are to be executed as shown in FIG. 7. These instruction streams 11-1, 11-2, 11-3 and 11-4 are in the same pattern. Each of the instruction streams 11-1, 11-2, 11-3 and 11-4 includes seven instructions Inst_1 to Inst_7 and two instructions INST_A. The instructions Inst_1 to Inst_7 require no operating resources (e.g., UNIT_A). The instructions INST_A require operating resources, or need to occupy operating resources until the instruction Inst_4 is completed.

Assume that the leading addresses of the instruction streams 11-1, 11-2 and 11-3 are registered in T0_PC, T1_PC and T2_PC of the instruction stream address register 11, respectively and the leading address of the instruction stream 11-4 is registered in T3_PC of the register 11.

In the second embodiment, a field "END" is added to the resource management information in the operating resource management table 12a, as shown in FIG. 6. This field is a location for storing data, which is reference data to determine the point of time when the operating resources can be released, before an instruction stream is completed. If the operating resource UNIT_A includes a data holding register, data of the field "End" corresponds to an address of a special instruction (Inst_4 in the second embodiment) given to obtain final access to the register.

A decoder 16a decodes an instruction (program) read out of the instruction cache 18. The decoder 16a has a function of determining whether an input instruction is a special one to obtain access to the register in the operating resource UNIT_A.

A register 21 stores the address of a special instruction and its contents are updated each time the decoder 16a decodes the special instruction. Assume that a plurality of instruction streams in the same pattern are each executed while varying data. If the instruction stream of the first pass is executed, the address finally stored in the register 21 is stored in the field "End" of the table 12a by update logic 17.

The wakeup logic 13 reads a required operating resource number (value of "#ofRes" and its corresponding "End" data out of the instruction resource management table 12a whenever the instruction streams in the same pattern are each executed. The wakeup logic 13 compares the "End" data and the value of each of the current program counters 14a, 14b and 14c. If both coincide with each other, the value of the current resource counter 15 is updated by adding the required operating resource number of the instruction streams under execution to the value of the current resource counter 15. Consequently, the operating resources can be released not when the instruction stream is completed but when the instruction stream need not be occupied.

Figure 8:
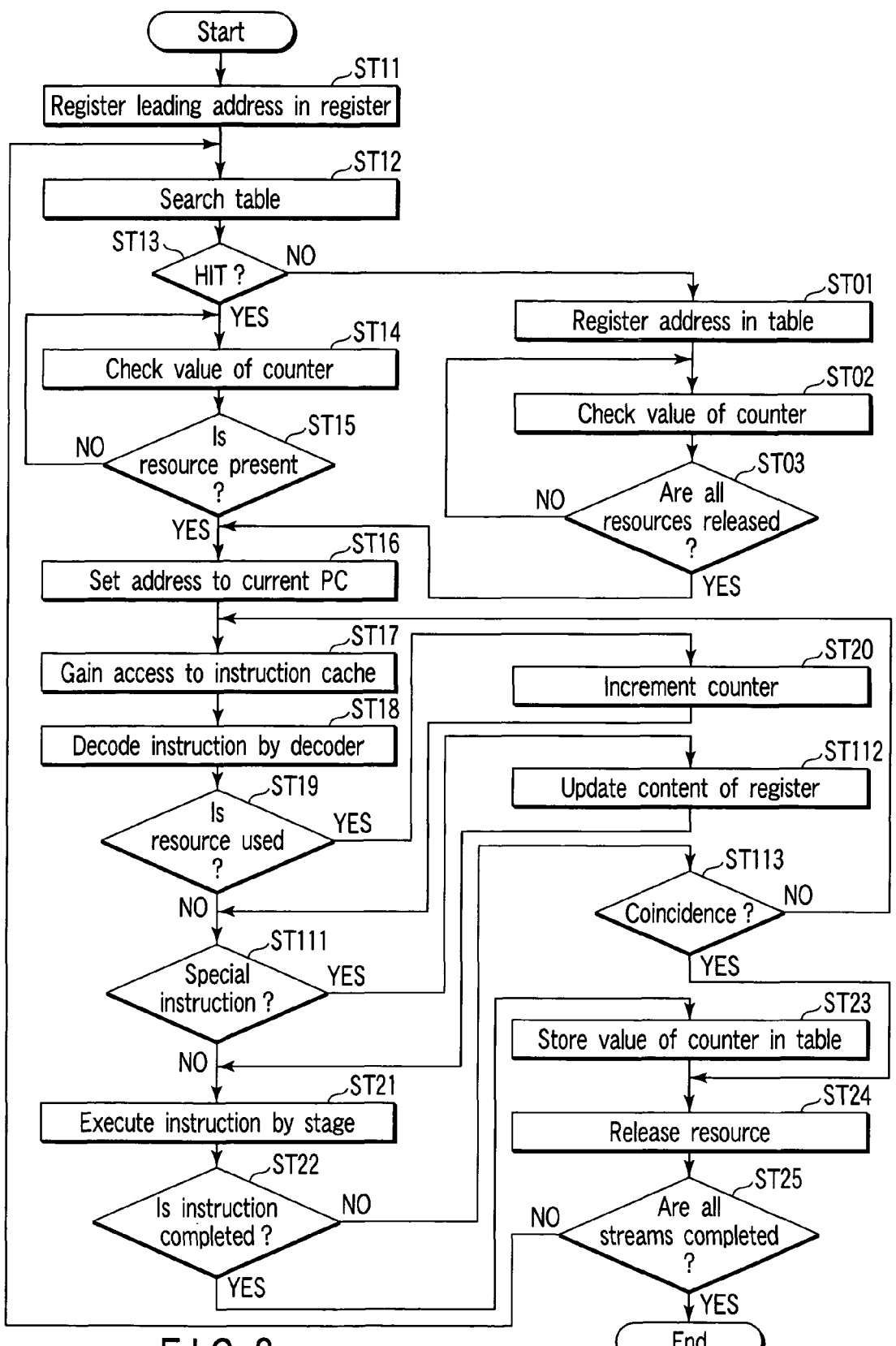
FIG. 8 is a flowchart illustrating an operation of the DSP shown in FIG. 6.

An operation of the DSP so configured will be described with reference to the flowchart shown in FIG. 8.

Assume first that the leading addresses of the instruction streams 11-1, 11-2, 11-3 and 11-4 are registered in the instruction stream address register 11 (step ST11). Then, the wakeup logic 13 searches the operating resource management table 12a based on the leading address registered in T0_PC of the register 11 (step ST12).

If the instruction stream 11-1 is executed for the first time (first pass), no hit is found in any resource management information registered in the table 12a (step ST13). In this case, upon receipt of an instruction from the wakeup logic 13, the update logic 17 stores part or all of the leading address of the instruction stream 11-1 in the field "Tag" corresponding to address "n" in the table 12a (step ST01).

After that, the wakeup logic 13 checks a value of the current resource counter 15 (step ST02). When none of operating resources UNIT_A are released (step ST03), the wakeup logic 13 stands by until they are all released. In the second embodiment, all the operating resources UNIT_A are released when the value of the current resource counter 15 is "5". In other words, all the operating resources UNIT_A are determined as unused (unoccupied) ones.

When all the operating resources UNIT_A are released (step ST03), the wakeup logic 13 sets the leading address of the instruction stream 11-1 to any one of the current program counters 14a, 14b and 14c (step ST16). The instruction cache 18 is thus accessed in accordance with the leading address (step ST17). The decoder 16a decodes an instruction fetched from the instruction cache 18 (step ST18). If the instruction requires an operating resource UNIT_A (step ST19), the value of the resource counter 19 is incremented by one (step ST20).

It is determined whether the decoded instruction is a special one to gain access to the registers of the operating resources UNIT_A (step ST111). If the instruction is special, part or all of the address thereof are set in the register 21 (step ST112). The contents of the register 21 are updated each time the decoder 16a decodes the special instruction.

Only when it is determined that all the preceding instruction streams are completed by releasing all the operating resources UNIT_A, the instruction execution stage 20 actually executes the instruction (step ST21). The wakeup logic 13 updates (5−2) the value of the current resource counter 15 in accordance with the total number (2) of operating resources UNIT_A used for executing the instruction stream 11-1.

After that, the decoder 16a detects the completion of the instruction stream 11-1 (step ST22). The value (2) of the resource counter 19 is sent to the update logic 17 and stored in the field "#ofRes" corresponding to the address "n" in the operating resource management table 12a (step ST23). Similarly, the content (address of Inst_4) of the register 21 is supplied to the update logic 17 and stored in the field "End" corresponding to the address "n" in the table 12a. The value "1" of "Valid" corresponding to the address "n" is updated to "1". Thus, the resource management information corresponding to the instruction stream 11-1 is registered in the table 12a.

When the instruction stream 11-1 is completed, the operating resources UNIT_A used for executing the instruction stream 11-1 are released (step ST24). The wakeup logic 13 updates (3+2) the value of the current resource counter 15 in accordance with the total number (2) of operating resources UNIT_A used for executing the instruction stream 11-1.

The wakeup logic 13 determines whether all the instruction streams 11-1, 11-2, 11-3 and 11-4 are completed or not (step ST25). If they are completed, the process ends.

If they are not completed, the process returns to step ST12. When the instruction streams in the same pattern are executed in sequence, the wakeup logic 13 searches the operating resource management table 12a in order to start the instruction stream 11-2 after the instruction stream 11-1 is completed (step ST12). At this time, the resource management information of the instruction stream 11-1 has already been registered in the table 12a. In other words, a hit is found in the resource management information of the instruction stream 11-1 since the instruction streams 11-1 and 11-2 have the same start address (step ST13).

If a hit is found in the resource management information, the value (2) of "#ofRes" and data (address of Inst_4) of "End" are read out of the resource management information. The value of "#ofRes" is subtracted from the value (5) of the current resource counter 15. The result of the subtraction is sent to the wakeup logic 13 (steps ST14 and ST15).

If the result of the subtraction is not negative, the wakeup logic 13 sets the leading address registered in T1_PC of the instruction stream address register 11 to any one of the unused current program counters PC14a, 14b and 14 (step ST16). After that, the process of step ST17 and the following steps is repeated. Accordingly, the instruction stream 11-2 starts to be executed.

If the result of the subtraction is negative, the wakeup logic 13 does not start to execute the instruction stream 11-2 before an adequate number of operating resources UNIT_A are obtained.

During the execution of the instruction stream 11-2, the wakeup logic 13 sets data (address of Inst_4) of "End" of the resource management information, which is read out of the operating resource management table 12a, to any one of the current program counters 14a, 14b and 14c and compares the data with the address of the instruction stream 11-1 that is incremented by the execution thereof (step ST113). If the data of "End" does not coincide with the address, the process of the step ST17 and the following steps is repeated.

If the data of "End" coincides with the address, the required number of operating resources of the instruction stream 11-2 under execution is added to the value of the current resource counter 15 to update the value of the counter 15 (step ST24). Thus, the operating resources UNIT_A can be released not when the instruction stream 11-2 is completed but when the instruction Inst_4 is done or when the operating resources UNIT_A need not be occupied.

As in the second embodiment, the instruction Inst_4 of each of the instruction streams 11-1, 11-2, 11-3 and 11-4 is the last one to gain access to the register of the operating resource UNIT_A used by the instruction INST_A, and the address of the instruction Inst_4 is managed as a special instruction. It is thus possible to determine the point of time when the operating resource UNIT_A need not be occupied during the execution of the instruction streams 11-1, 11-2, 11-3 and 11-4. For example, the operating resource UNIT_A needs to be occupied until the instruction Inst_4 is completed. During the execution of the instructions Inst_5 to Inst_7 after the instruction Inst_4 in the instruction streams 11-1, 11-2, 11-3 and 11-4, the operating resource UNIT_A can be released. If, therefore, the last instruction Inst_4 that requires the occupation of the operating resource UNIT_A is detected and the operating resource UNIT_A is released before the instruction stream 11-2 is completed, not only the instruction stream 11-3 subsequent to the stream 11-2, but also the instruction stream 11-4 subsequent thereto can be started early.

The present invention is not limited to the configurations of the DSP and instruction streams according to the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processing apparatus having a plurality of operating resources and configured to execute a plurality of instruction streams, comprising:
    an execution stage which executes each of the instruction streams using some of the operating resources;
    a first resource counter which counts the number of operating resources used when the execution stage executes a first one of the instruction streams;
    a management table which stores a count value of the first resource counter corresponding to the first one of the instruction streams;
    a second resource counter which holds data of the number of unused ones of the operating resources; and
    a control circuit which checks whether the number of operating resources required by the subsequent instruction streams is secured based on the management table and the second resource counter, and controls a start of executing of the subsequent instruction streams based on the management table and the second resource counter to execute the instruction streams in parallel.

2. The processing apparatus according to claim 1, wherein the instruction streams are in a same pattern and executed in sequence varying data.

3. The processing apparatus according to claim 1, wherein the operating resources are not released before an instruction stream using the operating resources is completed.

4. The processing apparatus according to claim 1, wherein the first resource counter counts the number of instructions which require the operating resources and which are decoded when the first one of the instruction streams is executed.

5. The processing apparatus according to claim 1, wherein the management table is configured by a content addressable memory (CAM).

6. The processing apparatus according to claim 1, wherein the management table is configured to search for the count value of the first resource counter based on at least part of a leading address of the first one of the instruction streams.

7. The processing apparatus according to claim 1, wherein the subsequent instruction streams are executed after the execution of the first one of the instruction streams is completed.

8. A processing apparatus having a plurality of operating resources and configured to execute a plurality of instruction streams at once, comprising:
  an execution stage which executes each of the instruction streams using some of the operating resources;
  a first resource counter which counts the number of operating resources used when the execution stage executes a first one of the instruction streams;
  a register which is updated by an address of an instruction that requires the operating resources when the execution stage executes the first one of the instruction streams;
  a management table which stores a count value of the first resource counter and a final address held in the register;
  a second resource counter which holds data of the number of unused ones of the operating resources; and
  a control circuit which reads the count value of the first resource counter from the management table when a subsequent instruction stream is executed, to control a start of execution of the subsequent instruction stream in accordance with a subtraction result obtained by subtracting the count value from the data held in the second resource counter, the control circuit reading the final address from the management table when the subsequent instruction stream is executed and comparing the final address with an address of an instruction decoded when the subsequent instruction stream is executed to release operating resources used by the subsequent instruction stream when the final address coincides with the address of the decoded instruction and to update the data held in the second resource counter in accordance with the number of released operating resources,
  wherein the control circuit checks whether the number of operating resources required by the subsequent instruction stream is secured based on the subtraction result before the subsequent instruction stream starts to be executed.

9. The processing apparatus according to claim 8, wherein the instruction streams are in a same pattern and executed in sequence varying data.

10. The processing apparatus according to claim 8, wherein the first resource counter counts the number of instructions which require the operating resources and which are decoded when the first one of the instruction streams is executed.

11. The processing apparatus according to claim 8, wherein the management table is configured by a content addressable memory (CAM).

12. The processing apparatus according to claim 8, wherein the management table is configured to search for the count value of the first resource counter and the final address based on at least part of a leading address of the first one of the instruction streams.

13. The processing apparatus according to claim 8, wherein the register stores an address of a special instruction which requires the operating resources and which are decoded last when the first one of the instruction streams is executed.

14. A processing apparatus having a plurality of operating resources and configured to execute a plurality of instruction streams, comprising:
  an execution stage which executes each of the instruction streams using some of the operating resources;
  a first resource counter which counts the number of operating resources used when the execution stage executes a first one of the instruction streams;
  a management table which stores a count value of the first resource counter corresponding to the first one of the instruction streams;
  a second resource counter which holds data of the number of unused ones of the operating resources; and
  a control circuit which checks whether the number of operating resources required by the subsequent instruction stream is secured based on the management table and the second resource counter, and controls a start of execution of another subsequent instruction stream following to the subsequent instruction stream based on the management table and the second resource counter to execute said another subsequent instruction stream in parallel with the subsequent instruction stream.

15. The processing apparatus according to claim 14, wherein the instruction streams are in a same pattern and executed in sequence varying data.

16. The processing apparatus according to claim 14, wherein the subsequent instruction stream is executed after the execution of the first one of the instruction streams is completed.

* * * * *